Figure 1:
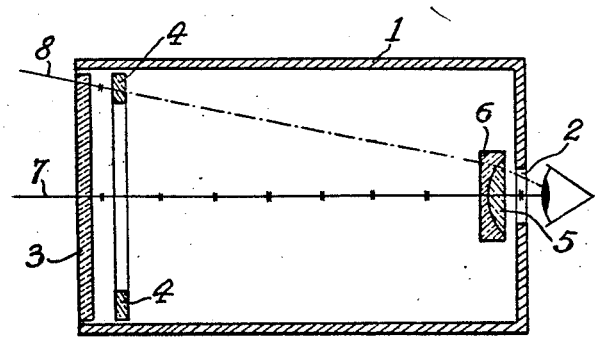

April 27, 1943. H. SAUER 2,317,809
FINDER FOR PHOTOGRAPHIC PURPOSES
Original Filed Sept. 10, 1938

INVENTOR.
Hans Sauer

Patented Apr. 27, 1943

2,317,809

UNITED STATES PATENT OFFICE 2,317,809

FINDER FOR PHOTOGRAPHIC PURPOSES

Hans Sauer, Dresden, Germany; vested in the Alien Property Custodian

Original application September 10, 1938, Serial No. 229,299. Divided and this application April 25, 1941, Serial No. 390,214. In Germany September 21, 1937

4 Claims. (Cl. 88—1.5)

The invention relates to improvements in finders for photographic purposes, and is a division of my patent application Serial No. 229,299 filed on the 10th day of September, 1938, in the United States Patent Office which has matured into Patent No. 2,244,505 of June 3, 1941. In particular, the invention is directed to finders which indicate correctly in advance that portion of the scene which will be projected by the camera objective on the negative. This desirable result can only be attained in a perfect manner when it is possible to observe distinctly together with the scene to be photographed certain marks indicating the boundary of the picture area.

The same result is obtained in finders for telescopes by producing a genuine picture of the scene in the plane in which the boundary marks are arranged.

In the well known collimation finders the mode of operation is the reverse, because a picture of the boundary marks, positioned practically at an indefinite distance, is reflected by means of semi-reflective and semi-transparent surface into the viewing field of the finder.

The semi-transparent mirror surface may have the shape of a concave mirror, as in the known Albada finder, which produces the boundary marks of the picture in a plane in which at the same time the scene to be photographed can be viewed sharply.

The first mentioned finders for telescopes have the disadvantage that the required number of optical elements is substantial and that these finders on account of their large size are not adapted to be installed in a camera, because the available space in a camera is limited. The principal disadvantage of the Albada finder is that the illumination of the picture boundary marks, which are arranged in rear of the semi-transparent surface, is insufficient, especially when the light is poor, as for instance when indoor pictures are to be made.

It is now the principal object of the present invention to rovide a finder which overcomes the disadvantages of the finders heretofore employed by providing optical means for producing the picture boundary marks and a picture of the scene to be photographed in a single plane in such a manner that the finder shows clearly and distinctly that portion of the scene which will appear on the negative.

Another object of the invention is to employ for the purpose of making the picture boundary marks better visible in the picture field of the finder certain means which differentially influence geometric optically the light beams producing the picture of the boundary marks and the scene to be photographed respectively.

Still another object of the invention is to employ for the purpose of making the picture boundary marks better visible in the picture field of the finder certain means which differently influence the physical properties, for instance the plane of vibration of the light of the light beams producing the picture of the boundary marks and the scene to be photographed respectively.

The present invention provides so to speak, a light switch having the effect that only the light rays omitted from the picture boundary marks pass through optical means serving to produce images of these boundary marks and then are conducted into the eye of the observer. It is immaterial, as far as the principle of the invention is concerned, how the optical means used for reproduction of the picture boundary marks is formed.

The present invention may be employed in collimators in the form of a lens whose curved surface has a plane face ground thereon or is provided with a central bore, as for instance is disclosed in the German patent specification 387,251. The invention may also be employed in collimators in the form of a half-lens or the like, as disclosed by way of example in the German patent specification 350,186. In fact, the invention may be applied to numerous other finder arrangements.

Other objects of the invention will be apparent from the following description with reference to the drawing which illustrates diagrammatically and by way of example a few embodiments of the invention. It is desired to point out, however, that the invention is not at all limited to the disclosed embodiment as various other forms may be adopted within the scope of the claim.

Figure 2:
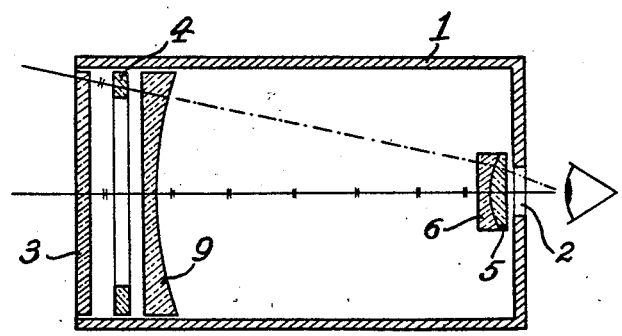

In the drawing:

Fig. 1 illustrates in a longitudinal sectional view one embodiment of the finder of the present invention, and Fig. 2 illustrates the principle of the invention applied to a Newton finder.

Fig. 1 illustrates a simple example of a finder comprising a casing with closed side walls and provided at its rear wall with an ocular opening 2 and in its front wall with a field opening in which is mounted a polarizing filter 3. Behind this filter 3 is placed a frame 4 of double refractive material. At the ocular opening 2 of the casing 1 is mounted a plano-convex lens 5 of double refractive material. This lens 5 is cemented to a plano-concave lens 6 made of glass. The refractive index of the glass lens 6 is the same as the smaller refractive index of the two indices of the double refractive lens 5. This has the effect that a light ray 7 passing through the polarizer 3 in the picture area of the finder passes in its polarized condition unrefracted through the two lenses 6, 5 which act as a glass plate having two parallel faces. A light ray 8, however, which after having passed through the polarizer 3 strikes the frame 4 of double refractive material vibrates in a plane approximately vertically to the plane of vibration of the light ray 7. Accordingly the lens combination 5, 6 acts with respect to the light beam 8 as a collective lens which produces the picture border.

Fig. 2 illustrates the invention applied to a Newton finder. The result with respect to the visibility of the picture border is the same as in the finder illustrated in Fig. 1. The field of the finder casing 1 is closed as in Fig. 1 by a polarizer 3, in rear of which is mounted the frame 4 of double refractive material. The ocular consists of a plano-convex lens 5 of double refractive material having cemented thereto a plano-concave lens 6 of glass. A negative lens 9 is arranged closely behind the frame 4.

The finder arrangements of the present invention absorb less light than a finder with semi-transparent reflective faces.

The boundary or border marks appearing so distinctly in the finder may be used for determining the center of the picture or any other desired points of the object to be photographed. It is for instance possible to employ the finder of the present invention to advantage in target practicing devices for aerial cameras and the like.

What I claim as my invention is:

1. A finder for photographic purposes, including a casing having closed side walls and provided at one end with a field opening and at the other end with an ocular opening in axial alinement with said field opening, a polarizing filter plate closing said field opening, the center portion of which forming the picture area of said finder, optical means within said casing for producing a picture boundary frame around said picture area, said optical means comprising a frame member of double refractive material mounted in rear of that portion of said polarizing plate forming the picture boundary frame, said frame causing the polarized light rays passing through the same to vibrate in a plane substantially at a right angle to the plane of vibration of the light rays which have passed through the center portion of said polarizing plate forming the picture area, and an ocular lens at said ocular opening, said ocular lens being composed of a plano-convex lens made of a double refractive material and a plano-concave lens cemented thereto.

2. A finder for photographic purposes, including a casing having closed side walls and provided at one end with a field opening and at the other end with an ocular opening in axial alinement with said field opening, a polarizing filter plate closing said field opening, the center portion of which forming the picture area of said finder, optical means within said casing for producing a picture boundary frame around said picture area, said optical means comprising a frame member of double refractive material mounted in rear of that portion of said polarizing plate forming the picture boundary frame, said frame causing the polarized light rays passing through the same to vibrate in a plane substantially at a right angle to the plane of vibration of the light rays which have passed through the center portion of said polarizing plate forming the picture area, and an ocular lens at said ocular opening, said ocular lens being composed of a plano-convex lens made of a double refractive material and a plano-concave lens cemented thereto, the lower refractive index of said double refractive material being of the same value as the refractive index of said plano-concave lens.

3. A finder for photographic purposes, including a casing having closed side walls and provided at one end with a field opening and at the other end with an ocular opening in axial alinement with said field opening, a polarizing filter plate closing said field opening, the center portion of which forming the picture area of said finder, a plano-concave finder lens of substantially the same size as said polarizing filter plate mounted within said casing adjacent said filter plate, the concave face of said finder lens facing said ocular opening, optical means within said casing for producing a picture boundary frame around said picture area, said optical means comprising a frame member of double refractive material mounted between said polarizing plate and said plano-concave finder lens, said frame causing the polarized light rays passing through the same to vibrate in a plane substantially at a right angle to the plane of vibration of the light rays which have passed through the center portion of said polarizing plate forming the picture area, and an ocular lens at said ocular opening, said ocular lens being composed of a plano-convex lens made of a double refractive material and a plano-concave lens cemented thereto, the lower refractive index of said double refractive material being of the same value as the refractive index of said plano-concave lens.

4. A finder for photographic purposes, including a casing having closed side walls and provided at one end with a field opening and at the other end with an ocular opening in axial alinement with said field opening, a polarizing filter plate closing said field opening, the center portion of which forming the picture area of said finder, a plano-concave finder lens of substantially the same size as said polarizing filter plate mounted within said casing adjacent said filter plate, the concave face of said finder lens facing said ocular opening, optical means within said casing for producing a picture boundary frame around said picture area, said optical means comprising a frame member of double refractive material mounted between said polarizing plate and said plano-concave finder lens, said frame causing the polarized light rays passing through the same to vibrate in a plane substantially at a right angle to the plane of vibration of the light rays which have passed through the center portion of said polarizing plate forming the picture area, and an ocular lens at said ocular opening, said ocular lens being composed of a plano-convex lens made of a double refractive material and a plano-concave lens cemented thereto.

HANS SAUER.